3,506,053
TIRE BEAD BREAKER

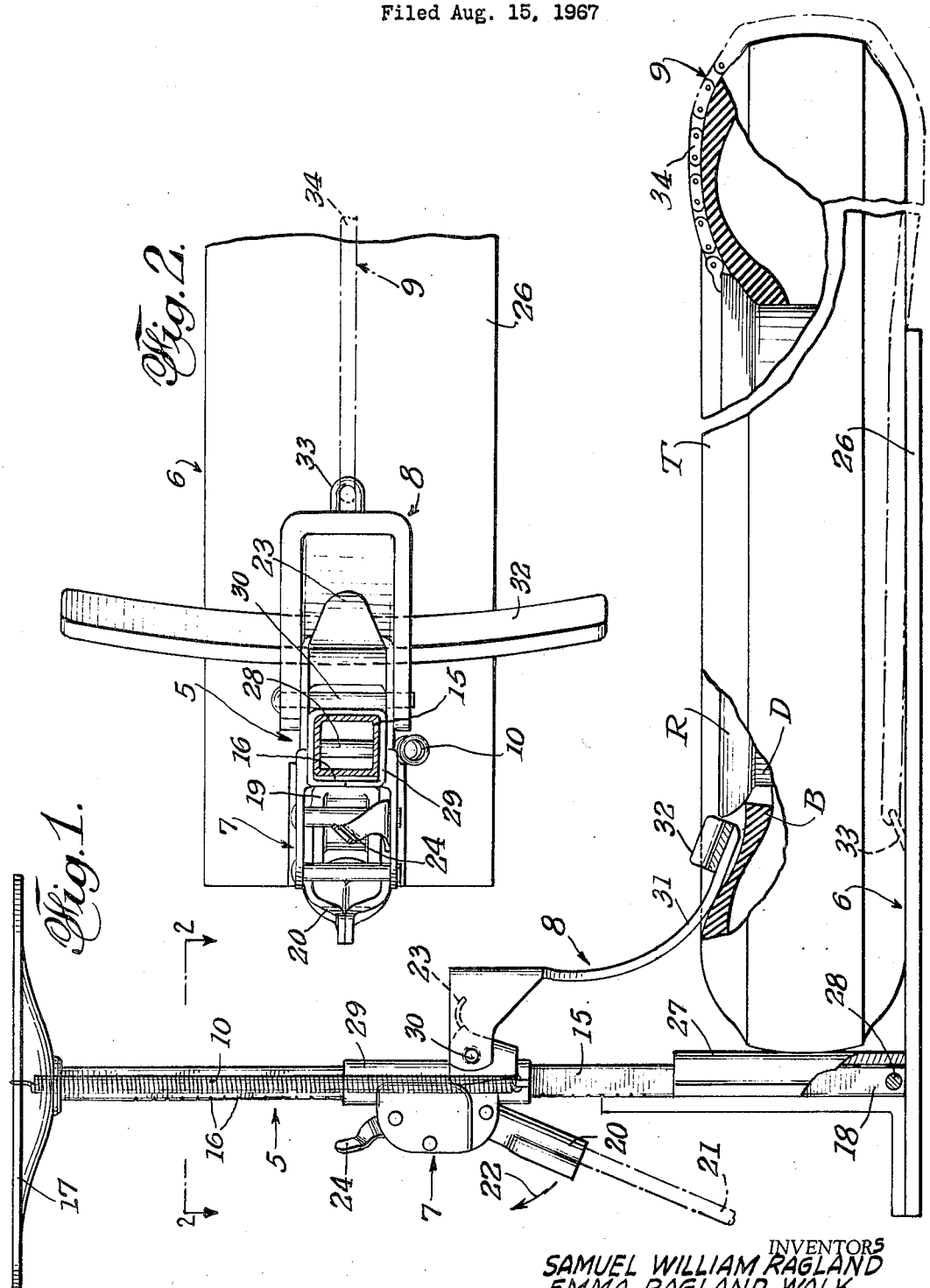

Samuel William Ragland, Seeley, and Emma Ragland Walk, Calipatria, Calif. (both of P.O. Box 172, Calipatria, Calif. 92233)
Filed Aug. 15, 1967, Ser. No. 660,669
Int. Cl. B60c 25/06
U.S. Cl. 157—1.26          6 Claims

ABSTRACT OF THE DISCLOSURE

A tire bead breaker that combines a bumper jack disposed upside down and held in said position by a base on which a pneumatic tire is adapted to be placed and releasably held in flat, horizontal position. A pivoted breaker arm is carried by the jack carriage and is lowered under power generated by the step-by-step jack mechanism conventional for bumper jacks. The lower end of the breaker arm, being pivoted, is readily moved to engage the tire bead adjacent the rim that mounts the same, and said power movement of the carriage with the breaker arm, breaks the bead away from the rim.

BACKGROUND OF THE INVENTION

Tire bead breaking or loosening machines are usually of table height, thereby entailing lifting of tires, some of which are quite heavy, onto said machines. Also, these machines are ordinarily designed to accommodate ordinary passenger and truck tires, but not larger tires as used on tractors and large-capacity diesel trucks. Further, a motorist may find himself in a remote location far from help to effect an exchange on one of the wheel discs of a blown tire for one that is usable.

An object of this invention is to provide a tire bead breaker that carries out removal of a tire from its rim while the tire is on the ground.

Another object is to provide a tire bead breaker that can be used to loosen the bead for a wide range of tire sizes, the device being limited only by extraordinary sized tires, as for large airplanes, i.e., by the size of the bumper jack used in its construction.

A further object of the invention is to provide a tire bead breaker which, because it includes a bumper jack as a component part thereof, is readily transportable since only relatively simple and readily stored additional components are required for combination with the bumper jack already available.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

SUMMARY OF THE INVENTION

The present tire bead breaker comprises, generally, a conventional bumper jack 5, a support base 6 preferably fixedly yet separably connected to the upper end of said jack, whereby said base holds the jack in upside down position so that power movement of the jack carriage 7 is downward rather than upward, as it is when the jack is conventionally used for lifting an end of a vehicle, and a breaker arm 8 for engaging the bead of a tire disposed on said base 6 pivotally mounted on the carriage 7. Optionally, means 9 may be provided for retaining the tire against forward displacement and in operative position during a bead-breaking operation, and a spring 10 to bias the carriage 7 to raised position, thereby clearing the space below the arm 8 for receiving another tire.

BRIEF DESCRIPTION OF THE DRAWING

In the drawing, like reference characters designate similar parts in the several views.

FIG. 1 is a partly broken away side elevational view of a tire bead breaker according to the present invention.

FIG. 2 is an enlarged plan sectional view as taken on the plane of the line 2—2 of FIG. 1.

DESCRIPTION OF THE PREFERRED FORM

The conventional tire jack 5 is shown as having a post 15, preferably of square tubing provided on one side face with a series of uniformly spaced rack teeth 16; a base plate 17 which, in the ordinary position of the jack as a lift device, supports the post 15 in vertical position with the end 18 up; the carriage 7 which is slidably mounted on said post and is provided with a dog 19 that is actuated by an arm 20, when oscillated or reciprocated by a handle 21 to have a step-by-step movement along the post toward the end 18 thereof by first engaging successive teeth 16 and then advancing the carriage relative to the engaged tooth when the arm 20 is moved in the direction of the arrow 22; a hook 23 on the carriage to engage beneath a bumper when the jack is right end up; and release means represented by a release lever 24. All of the conventional elements of the jack have not been included in the above description, only those elements that, when the jack is upside down, as in FIG. 1, intermittently move the carriage 7 downwardly toward its end 18 under power applied to the handle 21 during the portion of the stroke thereof represented by the arrow 22. The release lever 24 is actuated to cause retraction of the dog 19 from engagement with the rack teeth when a free return of the carriage 7 in an upward direction is desired. The carriage may be thus returned manually, but this operation is facilitated by the spring 10 that extends between the carriage and the plate 17, which is stretched when the carriage is moved downwardly and automatically retracts the carriage when released.

The base 6 is shown as a flat base member 26 upon which a tire T may be placed when its bead B is to be loosened from the rim R of the wheel disc D, and a socket 27 adjacent one end of said member 26 and which is adapted to receive the end 18 of the jack. Thus joined, the jack and base have a stable L-shape. The connection between the jack end 18 and the base socket 27 is preferably a separable one, a removable pin or bolt 28 being provided, for example, for effecting such separable connection.

According to the invention, the post-engaging housing 29 of the carriage 7 is provided with a pivot 30 on the side thereof opposite to the arm 20, the breaker arm 8 being mounted on said pivot and depending therefrom toward the base member 26. In this case, said arm 8 is provided with a forwardly curved extension 31 which at its lower end is provided with a cross strap 32 that is slightly concavely arced so as to have approximate conformation to the average curvature of a tire bead. Normally, said arm 8 hangs pendant against the jack post 15.

The means 9 may take various forms. In this case, the same may comprise a loop 33 affixed to the top of the base member 26 and a chain 34 or other articulated elongated member that, by one end, is connected to said loop, is trained around the part of the tire remote from the base socket 27, and has its opposite end separably engaged, as by a hook on said end, in one of the holes in the disc D provided for mounting bolts.

The operation is quite simple. With a tire in operative position, as above described, the carriage, from its upwardly retracted position, may be manually slid downwardly against the bias of the spring 10 until the curved extension 31 of the arm 8 encounters the top face of the tire and slides forwardly as the arm moves on its pivot 30. When the cross strap 32 encounters the rim R, the carriage lever 24 is moved from release position, which conditions the jack mechanism to an intermittent downward movement of the carriage as the handle 21 is reciprocated. The rim R limits the forward movement of the end of the extension 31 which, therefore, moves downwardly to break the bead 13 away from said rim, as shown in FIG. 1. The carriage 7 may now be raised, and the tire turned to bring another part of the bead thereof in register with the breaker arm 8. The above may then be repeated, as desired, to loosen the entire bead from the rim R.

The above-described bead breaker will, within its size capacity, break any drop-center rim, as well as implement rims (tractors, etc.), dune buggy rims, and many other types of rims.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A tire bead breaker comprising:
   (a) a conventional bumper jack having a base plate, a post extending therefrom, a carriage movable along said post in both directions, releasable, manually-operable power means to move the carriage intermittently in the direction away from said plate, and a spring interconnecting the base plate and carriage to bias the latter to move toward the base plate.
   (b) a horizontal support base provided with a vertical extension to separably engage the opposite end of the post and toward which the carriage is movable under power of the manually-operable means,
   (c) said jack post extending vertically upwardly from said base extension with the base plate thereof at the top, and
   (d) a bead breaker arm carried by the carriage and depending therefrom to engage and loosen the bead of a tire resting upon said support base.

2. A tire bead breaker according to claim 1, in which a pivotal connection between the breaker arm and carriage is provided so the latter has pivotal accommodation to the tire bead during a loosening operation.

3. A tire bead breaker according to claim 2, in which said arm is formed with a forwardly curved extension and is provided with a cross strap at the lower end of said extension for engaging the tire bead during loosening thereof.

4. A tire bead breaker according to claim 1, in which the extension on the support base is provided with a socket into which the jack post is fitted.

5. A tire bead breaker according to claim 4, in which a separable connection is provided between said post and the extension of the support base engaged therewith.

6. A tire bead breaker according to claim 1, in which the support base is provided with means to engage the tire to prevent its displacement relative to the support base during a bead loosening operation.

References Cited
UNITED STATES PATENTS

| | | | |
|---|---|---|---|
| 2,523,448 | 9/1950 | Reitz | 157—1.26 |
| 2,568,874 | 9/1951 | Vanleirsberghe | 157—1.26 |
| 2,575,330 | 11/1951 | Carlson | 157—1.17 |
| 2,678,089 | 5/1954 | Grant | 157—1.26 |
| 2,691,412 | 10/1954 | Wood | 157—1.26 |

GRANVILLE Y. CUSTER, JR., Primary Examiner